United States Patent
Hu et al.

(10) Patent No.: US 10,936,331 B2
(45) Date of Patent: *Mar. 2, 2021

(54) RUNNING A KERNEL-DEPENDENT APPLICATION IN A CONTAINER

(71) Applicant: INTERNATIONAL BUSINESS MACHINES CORPORATION, Armonk, NY (US)

(72) Inventors: Yanyan Hu, Anningjiayuan (CN); Guang Cheng Li, Beijing (CN); Yubo Li, Beijing (CN); Chao Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/440,477

(22) Filed: Feb. 23, 2017

(65) Prior Publication Data
US 2018/0239611 A1  Aug. 23, 2018

(51) Int. Cl.
G06F 9/445 (2018.01)
G06F 9/50 (2006.01)
G06F 9/455 (2018.01)

(52) U.S. Cl.
CPC .............. G06F 9/445 (2013.01); G06F 9/455 (2013.01); G06F 9/50 (2013.01)

(58) Field of Classification Search
None
See application file for complete search history.

(56) References Cited

U.S. PATENT DOCUMENTS

| 848,728 A | 4/1907 | Crolius |
| 7,962,918 B2 * | 6/2011 | Schaefer ............. G06F 9/44505 719/313 |

(Continued)

FOREIGN PATENT DOCUMENTS

CN  105204913 A  12/2015

OTHER PUBLICATIONS

Mainframe, ("Virtualization vs. Containerizatio"), Mar. 20, 2015, pp. 1-7.*

(Continued)

*Primary Examiner* — Doon Y Chow
*Assistant Examiner* — Phuong N Hoang
(74) *Attorney, Agent, or Firm* — Cantor Colburn LLP; Joseph Petrokaitis

(57) ABSTRACT

Examples of techniques for running kernel dependent applications in containers are disclosed. In one example implementation, a method includes initiating, by a processing system, a user mode Linux (UML) kernel in a container of a host. The method further includes initiating, by the processing system, an agent inside the UML, the agent configured to handle system call redirection from a host kernel of the host. The method further includes enabling, by the processing system, a system call hook kernel module on the host to hook a system call received from the container. The method further includes determining, by the processing system, whether the UML kernel is running inside the container. The method further includes, based at least in part on determining that the UML is running inside the container, passing, by the processing system, the system call to the UML kernel inside the container.

10 Claims, 6 Drawing Sheets

(56) References Cited

U.S. PATENT DOCUMENTS

| | | | |
|---|---|---|---|
| 8,266,616 B1 | 9/2012 | Jacquot et al. | |
| 8,806,511 B2* | 8/2014 | Adda | G06F 13/28 |
| | | | 719/321 |
| 9,300,720 B1* | 3/2016 | Qiu | G06F 9/45504 |
| 9,367,244 B2 | 6/2016 | Kulkarni | |
| 9,471,775 B1* | 10/2016 | Wagner | G06F 9/45533 |
| 9,729,579 B1* | 8/2017 | Marino | H04L 63/20 |
| 10,146,936 B1* | 12/2018 | Khanduja | G06F 21/552 |
| 10,613,885 B2* | 4/2020 | Aronovich | G06F 9/45545 |
| 2003/0014521 A1* | 1/2003 | Elson | G06F 9/5011 |
| | | | 709/225 |
| 2004/0216145 A1* | 10/2004 | Wong | H04L 29/06 |
| | | | 719/321 |
| 2005/0060722 A1* | 3/2005 | Rochette | G06F 8/60 |
| | | | 719/319 |
| 2010/0220354 A1* | 9/2010 | Honda | G06F 3/121 |
| | | | 358/1.15 |
| 2013/0152209 A1* | 6/2013 | Baumann | G06F 21/53 |
| | | | 726/26 |
| 2013/0198764 A1* | 8/2013 | Kacin | G06F 9/45537 |
| | | | 719/328 |
| 2014/0108649 A1* | 4/2014 | Barton | G06F 9/45533 |
| | | | 709/224 |
| 2014/0137184 A1* | 5/2014 | Russello | G06F 21/60 |
| | | | 726/1 |
| 2015/0199514 A1* | 7/2015 | Tosa | G06F 21/554 |
| | | | 726/17 |
| 2016/0378545 A1* | 12/2016 | Ho | G06F 9/50 |
| | | | 718/107 |
| 2017/0041184 A1* | 2/2017 | Broz | H04L 49/70 |
| 2017/0124320 A1* | 5/2017 | Fojtik | G06F 21/53 |
| 2018/0046487 A1* | 2/2018 | Matters | G06F 9/45558 |
| 2018/0123975 A1* | 5/2018 | Ayandeh | H04L 12/1886 |
| 2018/0247064 A1* | 8/2018 | Aronovich | G06F 21/6209 |

OTHER PUBLICATIONS

Jaxenter, ("Containerziation vs Virtualization—An introduction to Docker"), Sep. 14, 2015, pp. 1-11.*

Techtarget ("How is conteinerzation different from virtualization") pp. 1-5, Sep. 12, 2014.*

Whitman, ("Redirecting system calls from a C library"), Jul. 9, 2015, pp. 1-3.*

Wang, ("Protecting Containerized Applications with System Cal Profiling"), Dec. 6, 2016, pp. 1-9.*

List of IBM Patents or Patent Applications Treated as Related; CN920160178US1, Date Filed: Feb. 23, 2017, p. 1-2.

Yanyan Hu, et al.,"Running a Kernel-Dependent Application in a Container", U.S. Appl. No. 15/796,006, filed Oct. 27, 2017.

* cited by examiner

RUNNING A KERNEL-DEPENDENT APPLICATION IN A CONTAINER

BACKGROUND

The present invention generally relates to data processing and, more particularly, relates to techniques for running kernel dependent applications in containers.

The term "container" describes a computer programming technology that addresses the problem of how to get software to run reliably when moved from one computing environment to another. In its simplest form, a container provides an entire runtime environment bundled into one package, which includes an application, all the application dependencies, libraries, other binaries, and configuration files needed to run the container. By containerizing the application platform and its dependencies, differences in operating system distributions and underlying infrastructure are abstracted away.

Containers can be contrasted with virtualization technology. In virtualization technology, the package that can be passed around is a virtual machine, and it includes an entire operating system as well as the application. A physical server running three virtual machines would have a hypervisor and three separate operating systems running on top of it. By contrast, a server running three containerized applications, for example, runs a single operating system, and each container shares the operating system kernel with the other containers. Shared parts of the operating system are read only, while each container has its own mount (i.e., a way to access the container) for writing. As a result, containers are more "lightweight" and use fewer resources than virtual machines.

SUMMARY

According to embodiments of the present invention, techniques including methods, systems, and/or computer program products for running kernel dependent applications in containers are provided. An example method includes initiating, by a processing system, a user mode Linux (UML) kernel in a container of a host. The method further includes initiating, by the processing system, an agent inside the UML, the agent configured to handle system call redirection from a host kernel of the host. The method further includes enabling, by the processing system, a system call hook kernel module on the host to hook a system call received from the container. The method further includes determining, by the processing system, whether the UML kernel is running inside the container. The method further includes, based at least in part on determining that the UML is running inside the container, passing, by the processing system, the system call to the UML kernel inside the container.

Additional features and advantages are realized through the techniques of the present invention. Other aspects are described in detail herein and are considered a part of the invention. For a better understanding of the present invention with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

In computer technology, the "kernel" is the central component of computer operating systems. The kernel functions as a bridge between applications and the actual data processing done at the hardware level. The kernel's responsibilities include managing the system's resources, including specifically the communication between hardware and software components.

Containers are a computer programming technology that provides isolated environments that share a kernel to isolate a software application. Containers enable applications to be quickly and easily packaged, deployed, and run across different environments. Containers improve resource utilization by enabling multiple applications to run on the same processing system. Moreover, containers eliminate the need to change or reconfigure applications for different environments. This accelerates application development by precluding environment-related failures. Using containers enables applications to be seamlessly portable across environments and computing platforms. For example, it is possible to move a container between different Linux-based cloud environments.

Containers are useful for providing isolated environments that share a kernel to isolate a software application. However, in existing container technology, all containers on a host processing system ("host system") share the host system's kernel, which can cause functionality and compatibility problems. For example, kernel dependent applications (e.g., kernel modules, device drivers, kernel-version-sensitive applications, etc.) may experience compatibility problems. Robustness problems may also arise regarding reliability, availability, and serviceability (RAS).

Embodiments of the invention address the above-described problems by providing techniques for running kernel dependent applications in containers. In particular, embodiments of the invention provide a privileged container by running a User Mode Linux kernel (UML kernel) inside a container and hooking a container host kernel to redirect system calls to the UML kernel. Utilizing this approach improves security, stabilizes the host kernel, improves functionality when the container needs to manipulate the host kernel, for example, insert a kernel module or install device driver, and provides support for multiple kernel versions. It is possible to run debugging routines (e.g., straces, etc.) when performing system calls in the privileged container instance to show that the system call is hooked.

Figure 1:
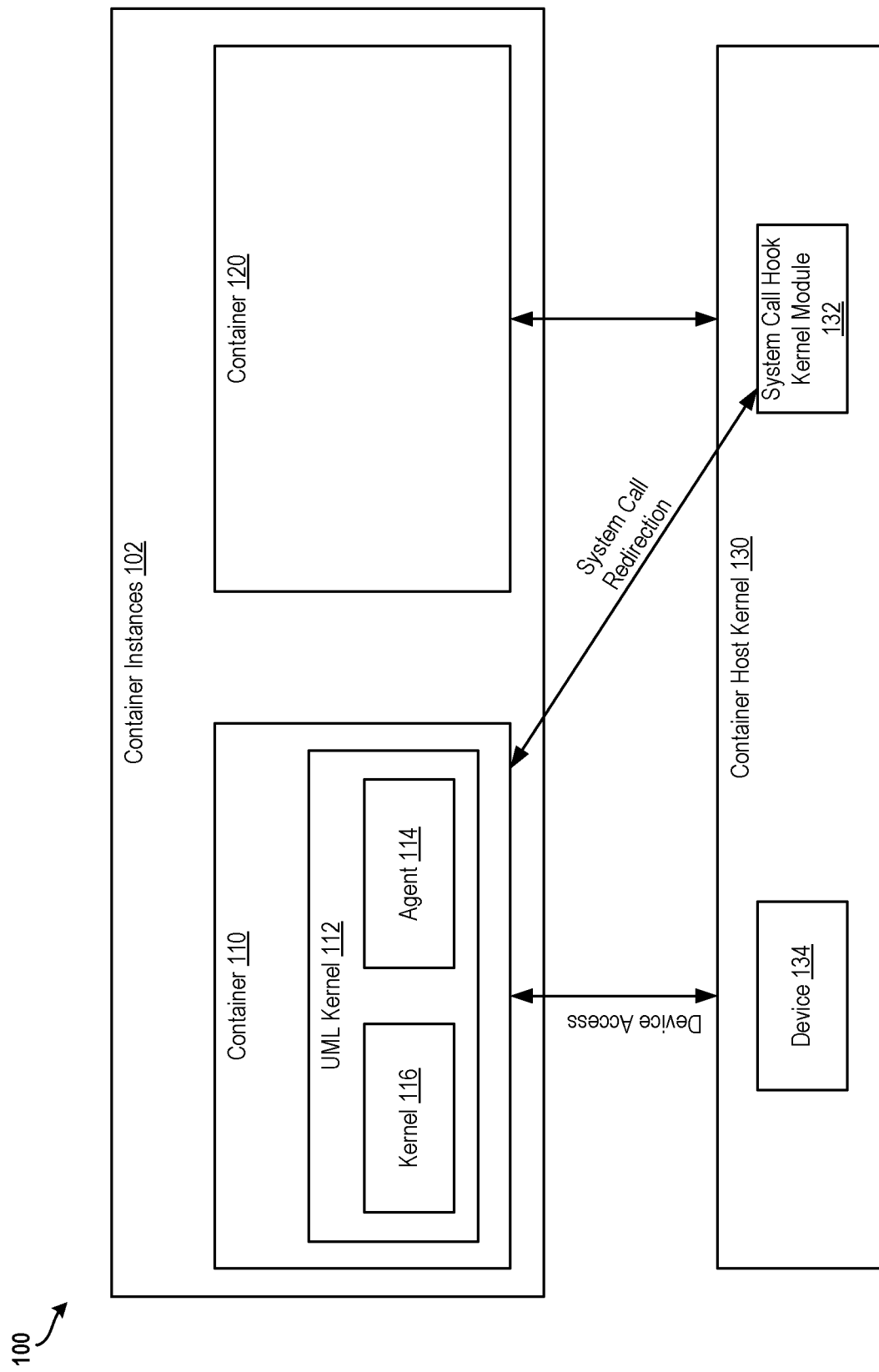
FIG. 1 illustrates a block diagram of a processing system for running kernel dependent applications in containers according to embodiments of the present invention.

FIG. 1 illustrates a block diagram of a processing system 100 for running kernel dependent applications in containers according to embodiments of the present invention. In the example embodiment shown in FIG. 1, the processing system 100 includes container instances 102 for hosting container 110 and container 120. Although not shown, additional containers may be included.

The container 110 includes a user mode Linux (UML) kernel 112 that executes an agent 114 and a kernel 116. The processing system 100 also includes a container host kernel 130 in communication with the containers 110, 120. The container host kernel 130 servers as the kernel for each of the containers 110, 120 since the containers 110, 120 do not have individual kernels. The host kernel 130 includes a system call hook kernel module 132, which is a module within the container host kernel 130. The host kernel 130 also includes a device 134 (e.g., a memory, a processor, an input device, an output device, etc.) that may be requested to be used by the containers 110, 120.

Generally, running kernel dependent applications in containers as described herein are first implemented and are then used during call flow. To implement the kernel dependent applications in containers, UML kernel 112 is started in the container that needs to run kernel dependent applications (e.g., the container 110). The UML kernel 112 provides a safe, secure way of running Linux versions and processes within the container 110.

An agent 114 inside the UML kernel 112 is then started to accept system calls that are captured by and redirected from the host kernel 130. The container host kernel 130 then enables the system call hook kernel module 132 on the container host kernel 130 to hook the system calls from the containers 110, 112. For example, hooking the system call enables intercepting the system call to capture and redirect the system call to the UML kernel 112 using the system call hook kernel module 132.

The system call hook kernel module 132 then checks to see if the UML kernel 112 is running inside the container 110, 120. If not (in the case of the container 120), then the system call hook module 132 does not do anything and instead passes the system call to the container host kernel 130 so that the device 134 can be accessed. However, if there is a UML kernel running inside the container (e.g., the container 110), then the system call hook kernel module 132 passes the system call to the agent 114 of the UML kernel 112 inside the container 110. The call flow may be implemented, for example, using a remote procedure call.

During the call flow (i.e., when there is a UML instance running inside the container), running kernel dependent applications in containers proceeds as follows. First, container 110 performs a system call that goes to the system call hook kernel module 132 in the container host kernel 130. The system call hook kernel module 132 passes the system call received from the container 110 to the UML kernel 112 instance running inside the container 110 through the agent 114 also running inside the container 110. That is, the system call hook kernel module 132 "hooks" the system calls to be redirected to another kernel instance. This provides transparency and safety to the container users and container instances (e.g., the containers 110, 120). The agent 114 then passes the system call to the kernel 116 portion of the UML kernel 112. The UML kernel 112 can then access the device 134 on the container host kernel 130 on the container host kernel 130 through the container 110.

If the container 120 initiates a system call, the system call of container 120 goes to the system call hook kernel module 13 of the container host kernel 130. In this example, no UML kernel instance is running inside the container 120, so the system call hook from the container 120 inside the system call hook kernel module 132 does not do anything and simply passes the system call to the container host kernel 130.

Accordingly, the present techniques enable running kernel dependent applications inside containers without affecting any other containers or the container host kernel. The use of the UML kernel provides system call service for the processes and containers 110, 120 on the processing system 100. There is no need to update the containers 110, 120 or the container host kernel 130.

In some examples, a UML pool container may be implemented to run different UML kernel versions. IN this case, the system call hook kernel module 132 redirects the system calls to a UML instance inside the UML pool container. The UML pool container needs to be tagged to indicate mappings between the container and the UML instance. In some situations, several containers could share a single UML instance.

The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus a system memory can store program instructions that when executed by the processing device implement the engines described herein. Other engines may also be utilized to include other features and functionality described in other examples herein.

Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 2:
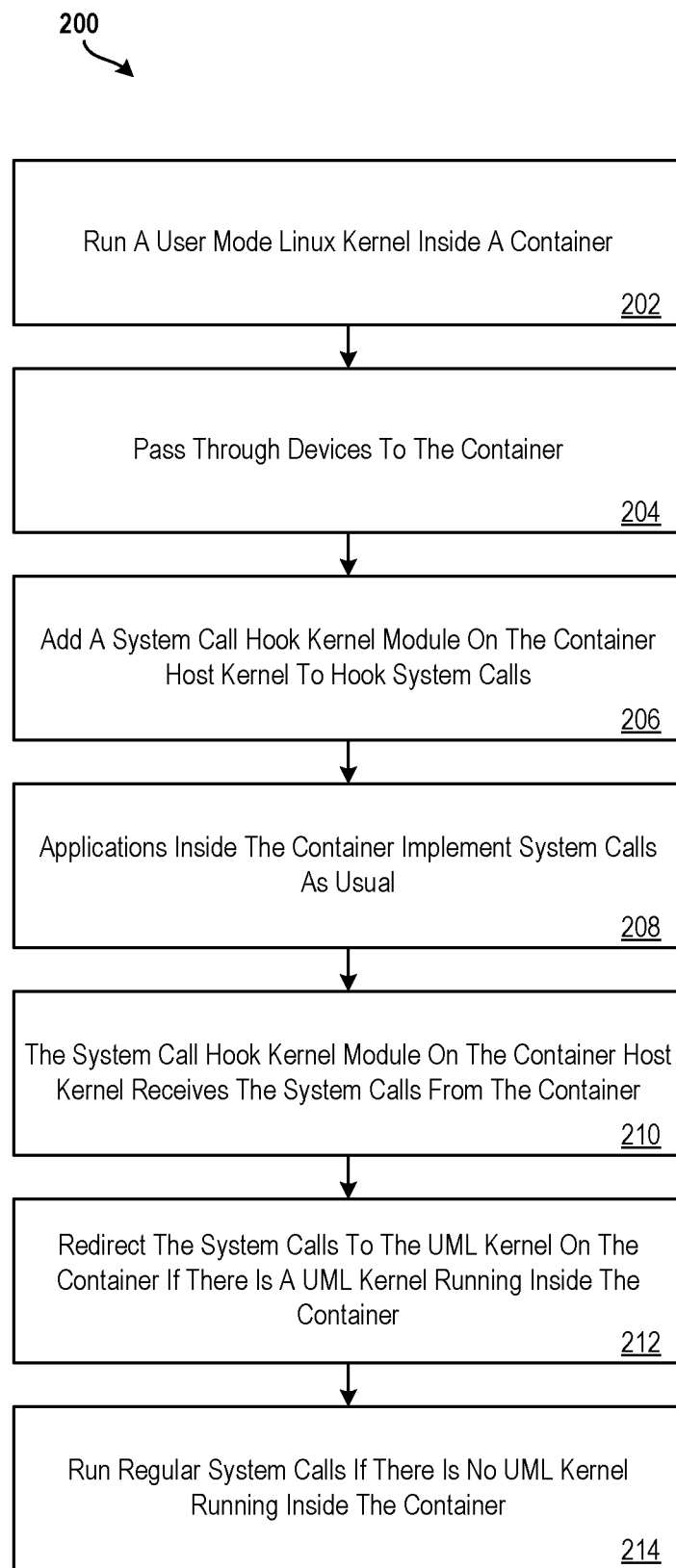
FIG. 2 illustrates a flow diagram of a method for running kernel dependent applications in containers according to embodiments of the present invention.

FIG. 2 illustrates a flow diagram of a method 200 for running kernel dependent applications in containers according to embodiments of the present invention. The method 200 may be performed, for example, by a processing system such as the processing system 100 of FIG. 1, by the processing system 400 of FIG. 4, or by another suitable processing system.

Generally, the method 200 provides for initiating a UML kernel (e.g., the UML kernel 112) on a container (e.g., the container 110) and initiating a system call hook kernel module (e.g., the system call hook kernel module 132) to capture and redirect system calls to an agent (e.g., the agent 114) of the UML kernel 112 of the container 110. This provides a privileged container (e.g., the container 110) by running a UML kernel inside the container 110 and capturing and redirecting system calls to the UML kernel via a system call hook kernel module. Utilizing this approach improves security, stabilizes the host kernel, improves functionality when multiple containers need different versions of kernel modules or device drivers, and provides support for multiple kernel versions At block 202, the method 200 includes running a user mode Linux kernel (e.g., the UML kernel 112) inside a container (e.g., the container 110). The UML kernel 112 provides a safe, secure way of running Linux versions and processes within the container 110. At block 204, the method 200 includes passing through system calls from devices (e.g., the device 134) to the container 110. At block 206, the method 200 includes adding a system call hook kernel module 132 on the container host kernel 130 to hook system calls. In this way, when system calls are captured by the system call hook kernel module 132, the system calls can be redirected to the agent 114 of the UML kernel 112 of the container 110. At block 208, the method 200 includes applications inside the container 110 implementing system calls as usual.

At block 210, the method 200 includes the system call hook kernel module 132 on the container host kernel 130 receiving the system calls from the container 110 (i.e., a typical system call). At block 212, the method 200 includes capturing and redirecting by the system call hook kernel module 132 the system calls to the agent 114 of the UML kernel 112 on the container 110 if there is a UML kernel running inside the container (e.g., the container 110). However, if there is no UML kernel running inside the container (e.g., the container 120, then at block 214, the method 200 includes passing the system call directly to the container host kernel 130 as usual.

Additional processes also may be included, and it should be understood that the processes depicted in FIG. 2 represent illustrations, and that other processes may be added or existing processes may be removed, modified, or rearranged without departing from the scope and spirit of the present invention.

Figure 3:
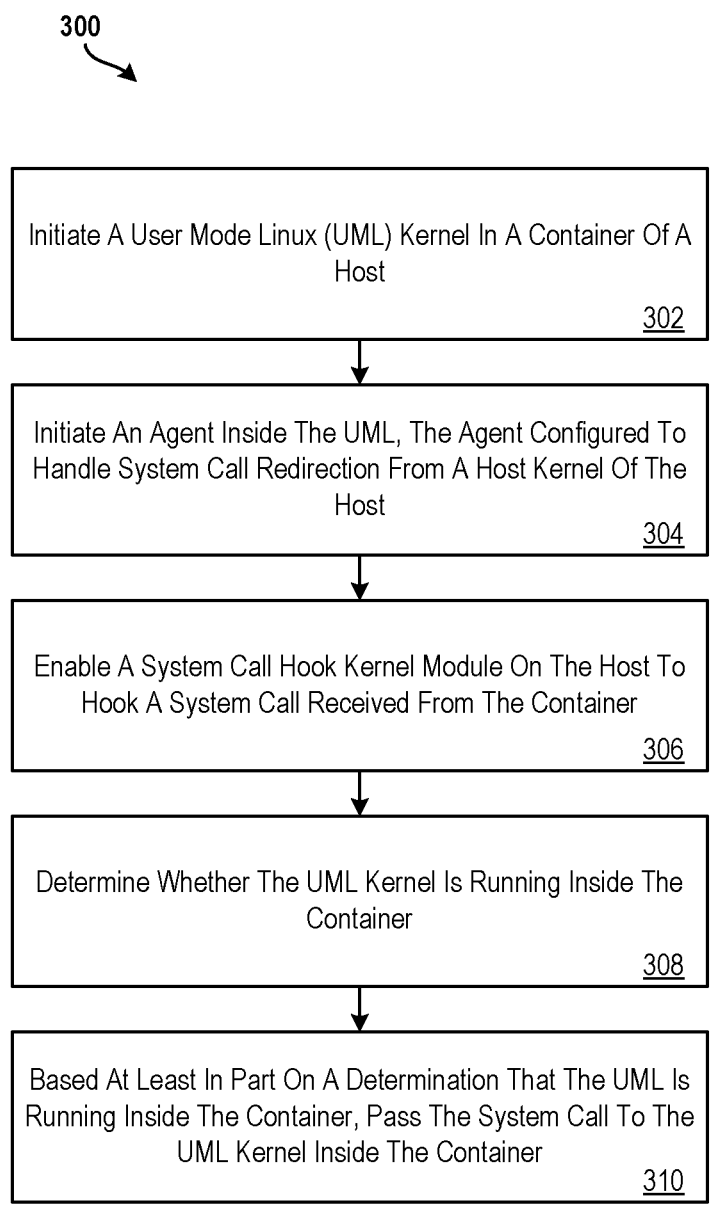
FIG. 3 illustrates a flow diagram of a method for running kernel dependent applications in containers according to embodiments of the present invention.

FIG. 3 illustrates a flow diagram of a method 300 for implementing kernel dependent applications in containers according to embodiments of the present invention. The method 300 may be performed, for example, by a processing system such as the processing system 100 of FIG. 1, by the processing system 400 of FIG. 4, or by another suitable processing system.

At block 302, the method 300 includes initiating a user mode Linux (UML) kernel (e.g., the UML kernel 112) in a container (e.g., the container 110) of a host (e.g., the processing system 110). At block 304, the method 300 includes initiating an agent (e.g., the agent 112) inside the UML. The agent is configured to accept system call redirection from a host kernel (e.g., the container host kernel 130) of the host. At block 306, the method 300 includes enabling a system call hook kernel module (e.g., the system call hook kernel module 132) on the host to hook (i.e., capture and redirect) a system call received from the container. At block 308, the method includes determining whether the UML kernel is running inside the container. At block 310, the method 300 includes, based at least in part on determining that the UML is running inside the container, passing the system call to the UML kernel inside the container.

In some examples, the method 300 may include, based at least in part on determining that the UML is not running inside the container, passing, by the processing system, the system call to the host kernel. In other examples, the method 300 may include receiving, at an agent of the UML kernel, the system call from the system call hook kernel module, and, subsequent to receiving the system call from the system call hook kernel module, accessing, by the UML kernel, a device on the host through the container.

Additionally, the method 300 may include initiating, by the processing system, UML pool container to run a plurality of different UML kernel versions. The system call hook kernel module redirects the system call to a UML instance inside the UML pool container. The container is tagged to indicate a mapping between the container and the UML instance inside the UML pool container.

Additional processes also may be included, and it should be understood that the processes depicted in FIG. 3 represent illustrations, and that other processes may be added or existing processes may be removed, modified, or rearranged without departing from the scope and spirit of the present invention.

Figure 4:
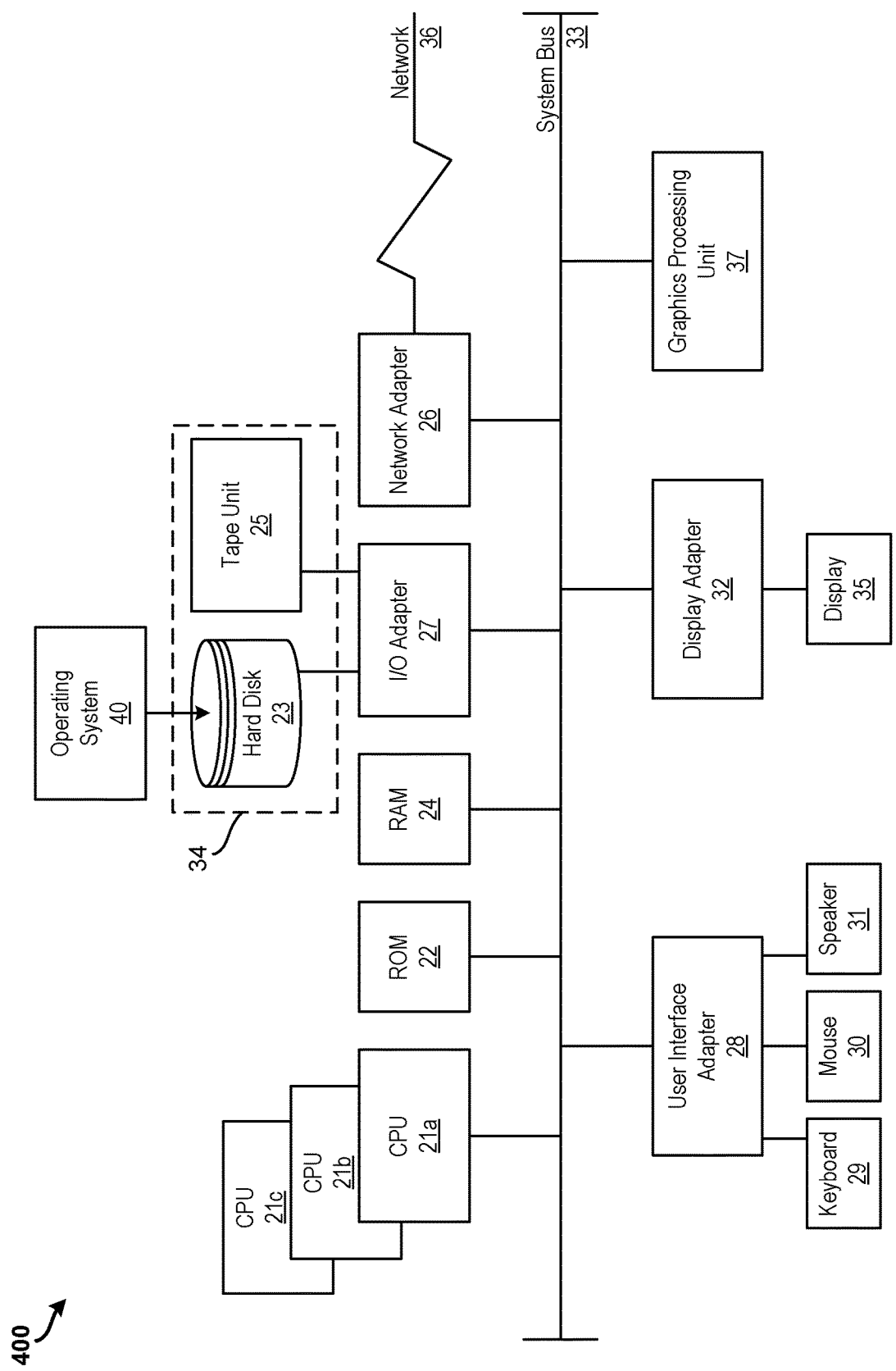
FIG. 4 illustrates a block diagram of a processing system for implementing the techniques described herein according to embodiments of the present invention.

It is understood that the present invention is capable of being implemented in conjunction with any other type of computing environment now known or later developed. For example, FIG. 4 illustrates a block diagram of a processing system 400 for implementing the techniques described herein. In examples, processing system 400 has one or more central processing units (processors) 21a, 21b, 21c, etc. (collectively or generically referred to as processor(s) 21 and/or as processing device(s)). In aspects of the present invention, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 400.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 400 may be stored in mass storage 34. A network adapter 26 interconnects system bus 33 with an outside network 36 enabling processing system 400 to communicate with other such systems.

A display (e.g., a display monitor) 35 is connected to system bus 33 by display adaptor 32, which may include a graphics adapter to improve the performance of graphics intensive applications and a video controller. In one aspect of the present invention, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present invention, processing system 400 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 21, storage capability including system memory (e.g., RAM 24), and mass storage 34, input means such as keyboard 29 and mouse 30, and output capability including speaker 31 and display 35. In some aspects of the present invention, a portion of system memory (e.g., RAM 24) and mass storage 34 collectively store an operating system such as the AIX® operating system from IBM Corporation to coordinate the functions of the various components shown in processing system 400.

In other examples, the present invention may be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
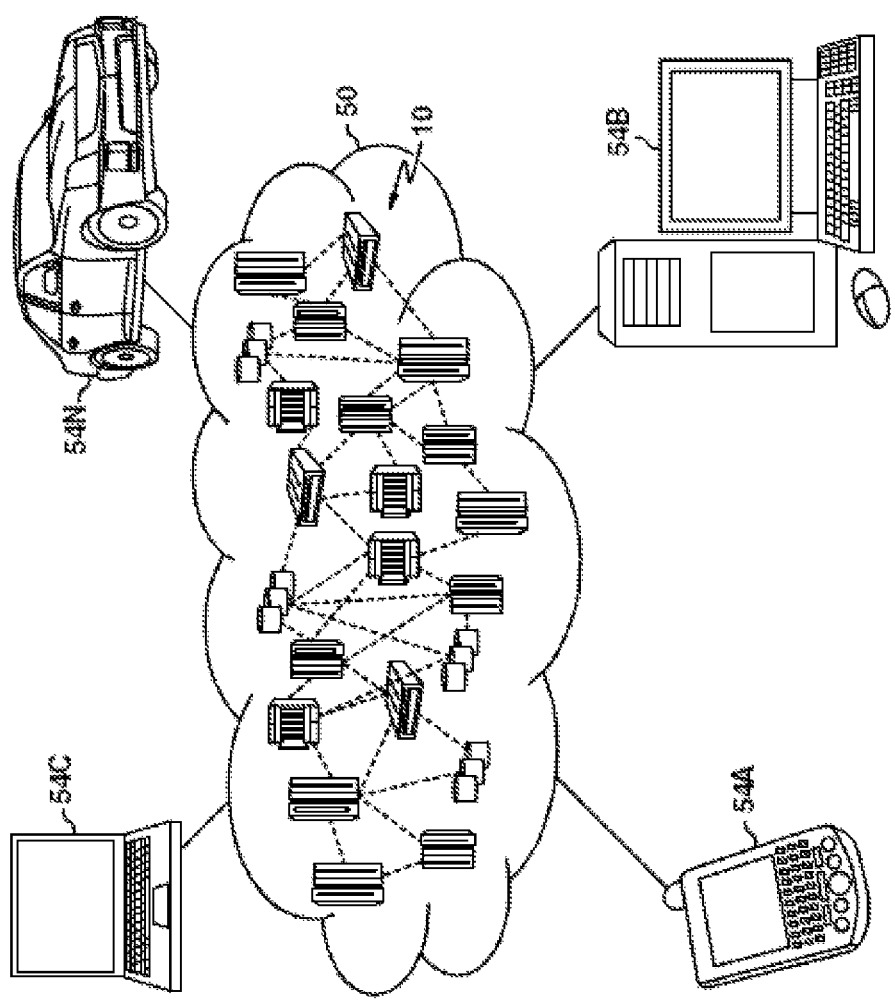
FIG. 5 illustrates a cloud computing environment according to embodiments of the present invention.

Referring now to FIG. 5, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
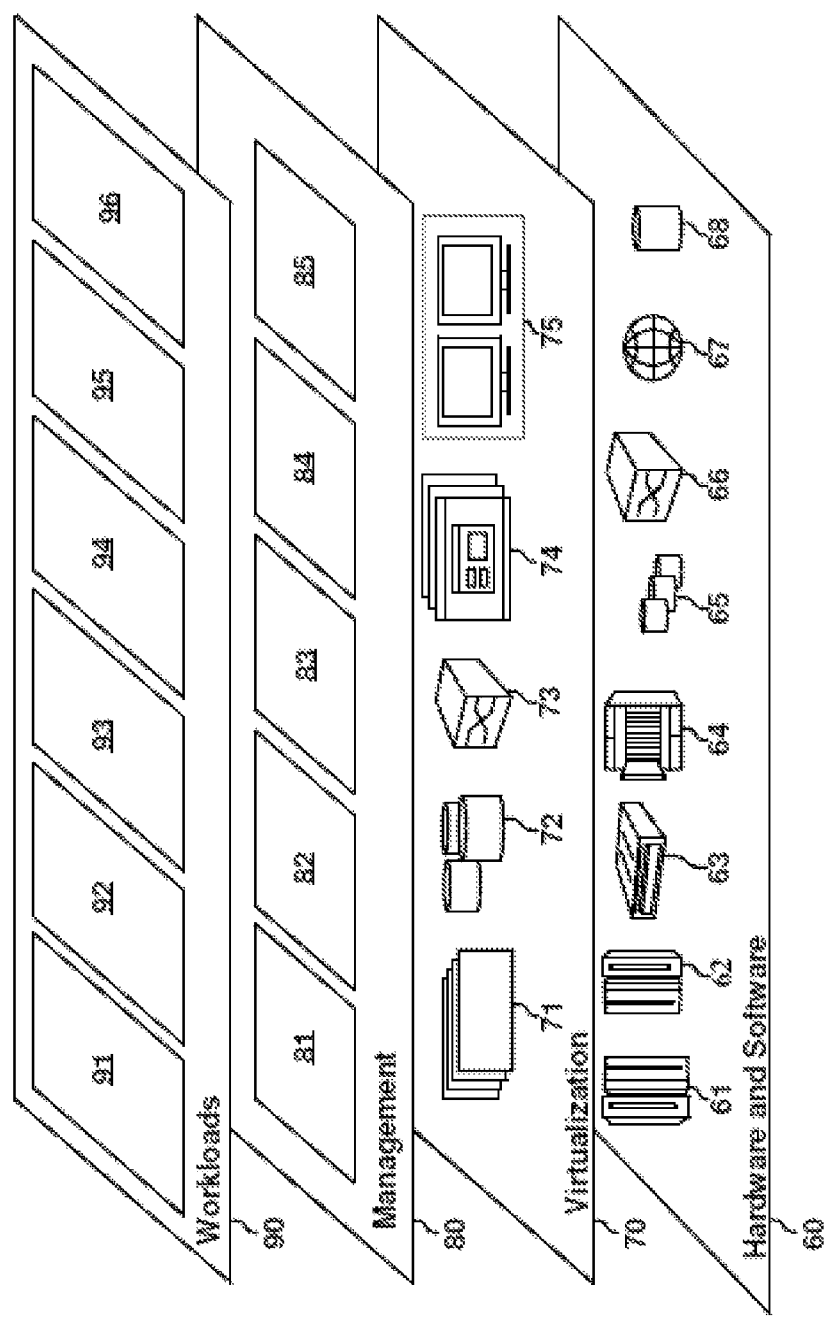
FIG. 6 illustrates abstraction model layers according to embodiments of the present invention.

Referring now to FIG. 6, a set of functional abstraction layers provided by cloud computing environment 50 (FIG. 5) is shown. It should be understood that the components, layers, and functions shown in FIG. 6 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and running kernel dependent application in containers 96.

The present techniques may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A system for running kernel dependent applications in containers, the system comprising:
    a memory comprising computer readable instructions; and
    a processing system for executing the computer readable instructions for performing a method, the method comprising:
        initiating, by a host kernel (130) of the processing system, a user mode Linux (UML) kernel (112) in a container (110), the container (110) being one from a plurality of containers that share the host kernel (130) for handling system calls from applications that are executing inside any of the containers;
        initiating an agent (114) inside the UML kernel (112), the agent (114);
        enabling, by the host kernel (130), a system call hook kernel module (132);
        receiving, by the host kernel (130), a system call from an application that is executing inside the container (110) by hooking the system call using the system call hook kernel module (132);
        determining, by the system call hook kernel module (132), that the container (110) includes the UML kernel (112) running inside the container (110);
        based at least in part on determining that the UML kernel (112) is running inside the container (110), redirecting, by the system call hook kernel module (132), the system call to the agent (114) of the UML kernel (112) inside the container (110); and
        based at least in part on determining that the UML kernel (112) is not running inside the container (120), passing by the system call hook kernel module (132), the system call to the host kernel (130).

2. The system of claim 1, wherein the method further comprises, receiving, at the agent of the UML kernel, the system call from the system call hook kernel module.

3. The system of claim 2, wherein the method further comprises, subsequent to receiving the system call from the system call hook kernel module, accessing, by the UML kernel, a device on the host through the container.

4. The system of claim 1, wherein the container is tagged to indicate a mapping between the container and the UML instance inside the UML pool container.

5. The system of claim 1, wherein the method further comprises, initiating, by the host kernel, a UML pool container to run a plurality of different UML kernel versions, wherein the system call hook kernel module redirects the system call to a UML instance inside the UML pool container and a second container of the host shares the UML instance.

6. A computer program product for running kernel dependent applications in containers, the computer program product comprising:
    a computer readable storage medium having program instructions embodied therewith, the program instructions executable by a processing system to cause the processing device to perform a method comprising:
        initiating, by a host kernel (130) of the processing system, a user mode Linux (UML) kernel (112) in a container (110), the container (110) being one from a plurality of containers that share the host kernel (130) for handling system calls from applications that are executing inside any of the containers;
        initiating an agent (114) inside the UML kernel (112), the agent (114);
        enabling, by the host kernel (130), a system call hook kernel module (132);
        receiving, by the host kernel (130), a system call from an application that is executing inside the container (110) by hooking the system call using the system call hook kernel module (132);
        determining, by the system call hook kernel module (132), whether that the container (110) includes the UML kernel (112) running inside the container (110);
        based at least in part on determining that the UML kernel (112) is running inside the container (110), redirecting, by the system call hook kernel module (132), the system call to the agent (114) of the UML kernel (112) inside the container (110); and
        based at least in part on determining that the UML kernel (112) is not running inside the container (120), passing by the system call hook kernel module (132), the system call to the host kernel (130).

7. The computer program product of claim 6, wherein the method further comprises, based at least in part on determining that the UML kernel is not running inside the container, passing, by the processing system, the system call to the host kernel.

8. The computer program product of claim 6, wherein the method further comprises receiving, at the agent of the UML kernel, the system call from the system call hook kernel module.

9. The computer program product of claim 8, wherein the method further comprises, subsequent to receiving the system call from the system call hook kernel module, accessing, by the UML kernel, a device on the host through the container.

10. The computer program product of claim 6, wherein the method further comprises, initiating, by the host kernel, a UML pool container to run a plurality of different UML kernel versions, wherein the system call hook kernel module redirects the system call to a UML instance inside the UML pool container and a second container of the host shares the UML instance.

\* \* \* \* \*